United States Patent
Yoshino (10) Patent No.: US 11,772,426 B2
(45) Date of Patent: Oct. 3, 2023

(54) HEAVY-DUTY TIRE

(71) Applicant: Sumitomo Rubber Industries, Ltd., Kobe (JP)

(72) Inventor: Masayuki Yoshino, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/739,581

(22) Filed: May 9, 2022

(65) Prior Publication Data
US 2022/0396095 A1 Dec. 15, 2022

(30) Foreign Application Priority Data
Jun. 3, 2021 (JP) .................................. 2021-093861

(51) Int. Cl.
*B60C 9/18* (2006.01)
*B60C 9/28* (2006.01)
*B60C 9/20* (2006.01)

(52) U.S. Cl.
CPC ........ *B60C 9/20* (2013.01); *B60C 2009/2016* (2013.01); *B60C 2009/2019* (2013.01); *B60C 2009/2077* (2013.01); *B60C 2009/2083* (2013.01); *B60C 2200/06* (2013.01)

(58) Field of Classification Search
CPC . B60C 9/18; B60C 9/1835; B60C 2009/1871; B60C 2009/2067; B60C 2009/2083; B60C 2009/2019; B60C 2009/2022; B60C 2009/2061; B60C 2009/2077
See application file for complete search history.

(56) References Cited

U.S. PATENT DOCUMENTS

| | | | | |
|---|---|---|---|---|
| 4,890,658 A | * | 1/1990 | Kabe | B60C 11/01 152/209.27 |
| 5,318,643 A | * | 6/1994 | Mizner | D07B 1/062 152/526 |
| 2009/0095396 A1 | * | 4/2009 | Harikae | B60C 9/2006 152/527 |

FOREIGN PATENT DOCUMENTS

| EP | 849098 | * | 6/1998 |
| JP | 2013-184637 | * | 9/2013 |
| JP | 2020-63051 A | | 4/2020 |

* cited by examiner

*Primary Examiner* — Justin R Fischer
(74) *Attorney, Agent, or Firm* — Birch, Stewart, Kolasch & Birch, LLP (57) ABSTRACT

A heavy-duty tire comprises a tread reinforcing belt comprising first to fourth belt plies each composed of belt cords inclined with respect to the tire equatorial plane. The first radial distance L1 between the belt cords of the third belt ply and the belt cords of the fourth belt ply is not more than the second radial distance L2 between the belt cords of the second belt ply and the belt cords of the third belt ply. The cord count E4 of the fourth belt ply is smaller than the cord count E3 of the third belt ply.

14 Claims, 3 Drawing Sheets

HEAVY-DUTY TIRE

BACKGROUND OF THE INVENTION

Field of the Invention

The present disclosure relates to a heavy-duty tire.

Background Art

The following Patent Document 1 discloses a heavy-duty pneumatic tire which is provided, on the radially outside of a crown portion of the carcass, with an inclined belt which is composed of a first belt layer and a second belt layer, and a reinforcing element of the first belt layer and a reinforcing element of the second belt layer incline with respect to a tire circumferential direction so as to cross each other between the layers.

Patent Document 1: Japanese Patent Application Publication No. 2020-063051

SUMMARY OF THE INVENTION

Problems to be Solved by the Invention

In recent years, on the other hand, due to growing interest in global environmental problems, heavy-duty tires are also required to have reduced rolling resistance, and further strongly required to have improved durability performance. In the above tire, however, there is room for improvement in durability performance.

The present disclosure was made in view of the above circumstances, and an object of the present disclosure is to provide a heavy-duty tire capable of improving the rolling resistance performance as well as the durability performance.

Means for Solving the Problems

According to the present disclosure, a heavy-duty tire comprises: a tread portion;
a pair of axially spaced bead portions each with a bead core therein; a pair of sidewall portions extending between the tread edges and the bead portions; a carcass extending between the bead cores in the bead portions through the tread portion and the sidewall portions; and a tread reinforcing belt disposed radially outside the carcass in the tread portion, wherein
the belt comprises a first belt ply, a second belt ply, a third belt ply and a fourth belt ply which are arranged in this order from the carcass side toward the outside in the tire radial direction, and
each of the first to fourth belt plies is composed of belt cords inclined with respect to the tire equatorial plane, wherein
a first distance L1 in the tire radial direction between the belt cords of the third belt ply and the belt cords of the fourth belt ply is not more than a second distance L2 in the tire radial direction between the belt cords of the second belt ply and the belt cords of the third belt ply, and
with respect to a cord count of a belt ply which is the number of the belt cords per unit width of the belt ply, a cord count E4 of the fourth belt ply is smaller than a cord count E3 of the third belt ply.

Effects of the Invention

In the heavy-duty tire according to the present disclosure, therefore, owing to the above configuration or arrangement, it is possible to improve the rolling resistance performance and the durability performance.

DETAILED DESCRIPTION OF THE INVENTION

Hereinafter, embodiments of the present disclosure will be described with reference to the accompanying drawings.

Figure 1:
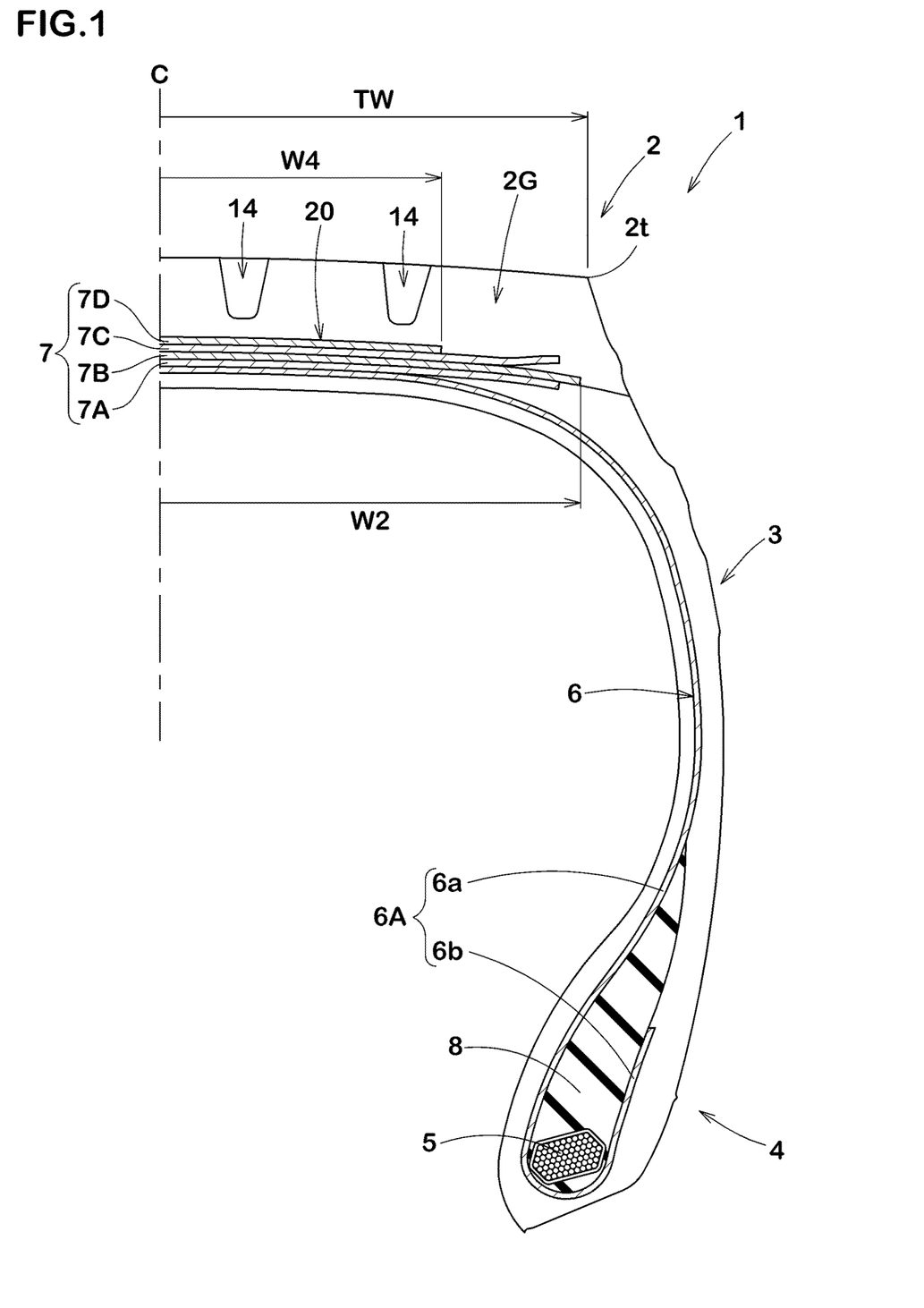
FIG. 1 is a tire meridian cross-sectional view of a heavy-duty tire as an embodiment of present disclosure.

FIG. 1 shows a meridian cross section including the tire rotation axis (not shown), of a right half of a heavy-duty tire 1 (hereinafter, may be simply referred to as the tire 1). The tire 1 in the present embodiment is designed for use with, for example, a truck or a bus.

The tire 1 in the present embodiment comprises: a tread portion 2; a pair of axially spaced bead portions 4 each with a bead core 5 therein; a pair of sidewall portions 3 extending between tread edges 2t and the bead portions 4; a carcass 6 extending between the bead cores 5 in the bead portions 4 through the tread portion 2 and the sidewall portions 3; and a tread reinforcing belt 7 disposed radially outside the carcass 6 in the tread portion 2.

Here, the tread edges 2t are the axial outermost edges of the ground contacting patch of the tire which occurs under a normally inflated loaded state when the camber angle of the tire is zero.

The undermentioned tread width TW is the width measured under a normally inflated unloaded state, as the axial distance between the tread edges 2t determined as above.

The normally inflated unloaded state is such that the tire is mounted on a standard wheel rim and inflate to a standard pressure but loaded with no tire load.

The normally inflated loaded state is such that the tire is mounted on the standard wheel rim and inflated to the standard pressure and loaded with a standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list.

For example, the standard wheel rim is the "standard rim" specified in JATMA, the "Measuring Rim" in ETRTO, the "Design Rim" in TRA or the like.

The standard pressure is the "maximum air pressure" in JATMA, the "Inflation Pressure" in ETRTO, the maximum pressure given in the "Tire Load Limits at Various Cold Inflation Pressures" table in TRA or the like.

The standard tire load is the "maximum load capacity" in JATMA, the "Load Capacity" in ETRTO, the maximum value given in the above-mentioned table in TRA or the like.

In this application including specification and claims, various dimensions, positions and the like of the tire refer to those under the normally inflated unloaded state of the tire unless otherwise noted.

[Tread Portion]

The tread portion 2 is provided with a tread rubber 2G disposed on the radially outer side of the belt 7. The tread rubber 2G is provided with main grooves 14 extending in the tire circumferential direction. The main grooves 14 are recessed inward in the tire radial direction from the radially outer surface of the tread portion 2.

[Carcass]

The carcass 6 is composed of at least one, in the present embodiment, only one carcass ply 6A. The carcass ply 6A extends between the bead portions 4 through the tread portion 2 and the sidewall portions 3 and is turned up around the bead core 5 in each bead portion 4 so as to form a pair of turned up portions 6b and a main portion 6a therebetween.

Each of the bead portions 4 is provided, between the turned up portion 6b and the main portion 6a, with a rubber bead apex 8 extending radially outwardly from the bead core 5.

The carcass ply 6A is composed of carcass cords (not shown), for example, arranged radially at an angle of 75 to 90 degrees with respect to the tire equatorial plane C. As the carcass cords, for example, steel cords can be suitably used.

[Belt]

Figure 2:
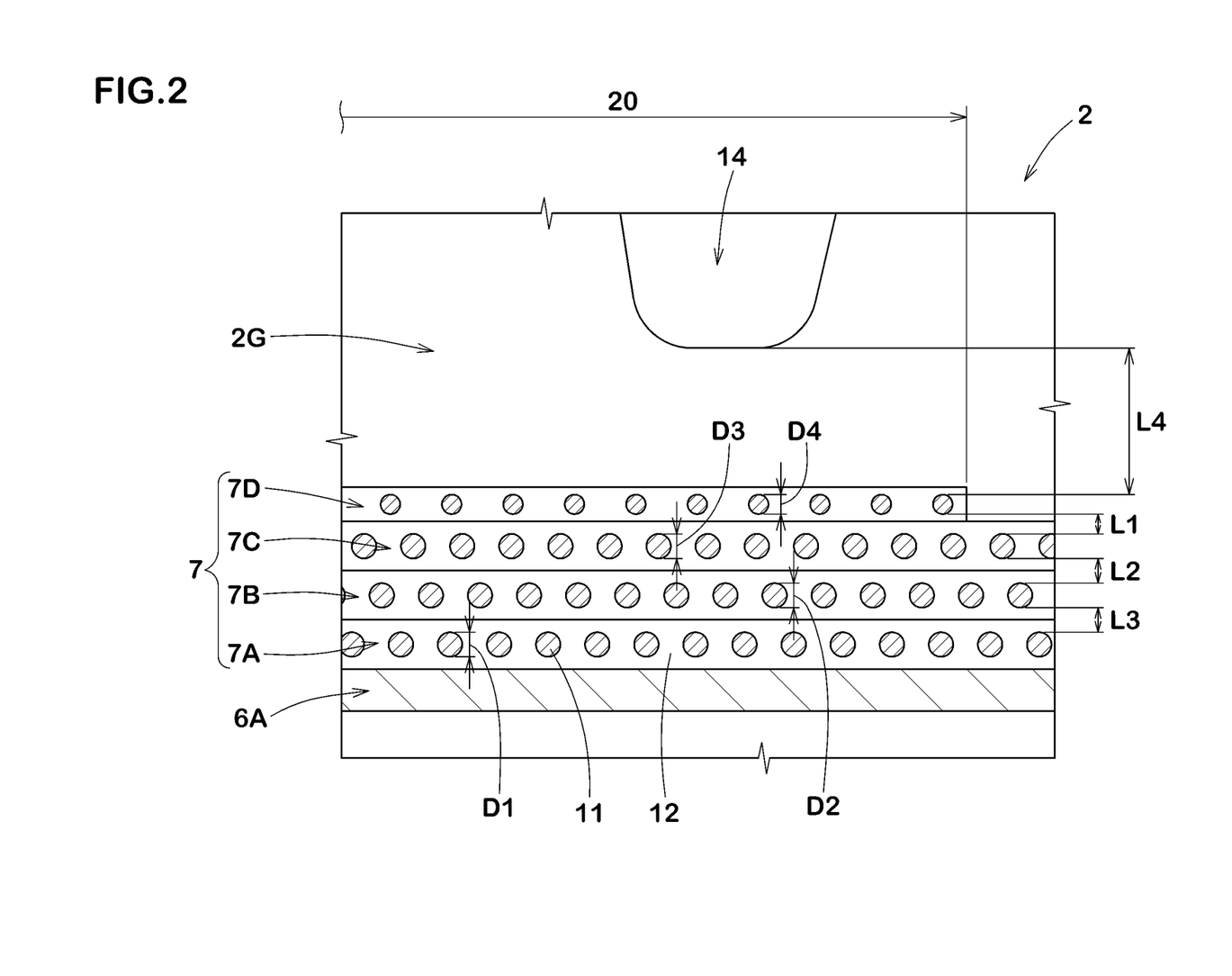
FIG. 2 is an enlarged partial view of the tread portion of FIG. 1.

As shown in FIG. 2, for example, the belt 7 is composed of a plurality of belt plies each composed of parallel belt cords 11 covered with a topping rubber 12.

In the present embodiment, each belt cord 11 is made of a plurality of steel filaments (not shown) twisted together. The belt cords 11 is not limited to such a structure formed from the twisted steel filaments, and may be a single steel filament, for example.

In the present embodiment, as shown in FIGS. 1 and 2, the belt 7 is composed of a first belt ply 7A, a second belt ply 7B, a third belt ply 7C and a fourth belt ply 7D arranged in this order from the inside to the outside in the tire radial direction.

In the present embodiment, as shown in FIG. 1, among the first belt ply 7A to the fourth belt ply 7D, the second belt ply 7B has a largest axial width W2, and the fourth belt ply 7D has a smallest axial width W4.

Figure 3:
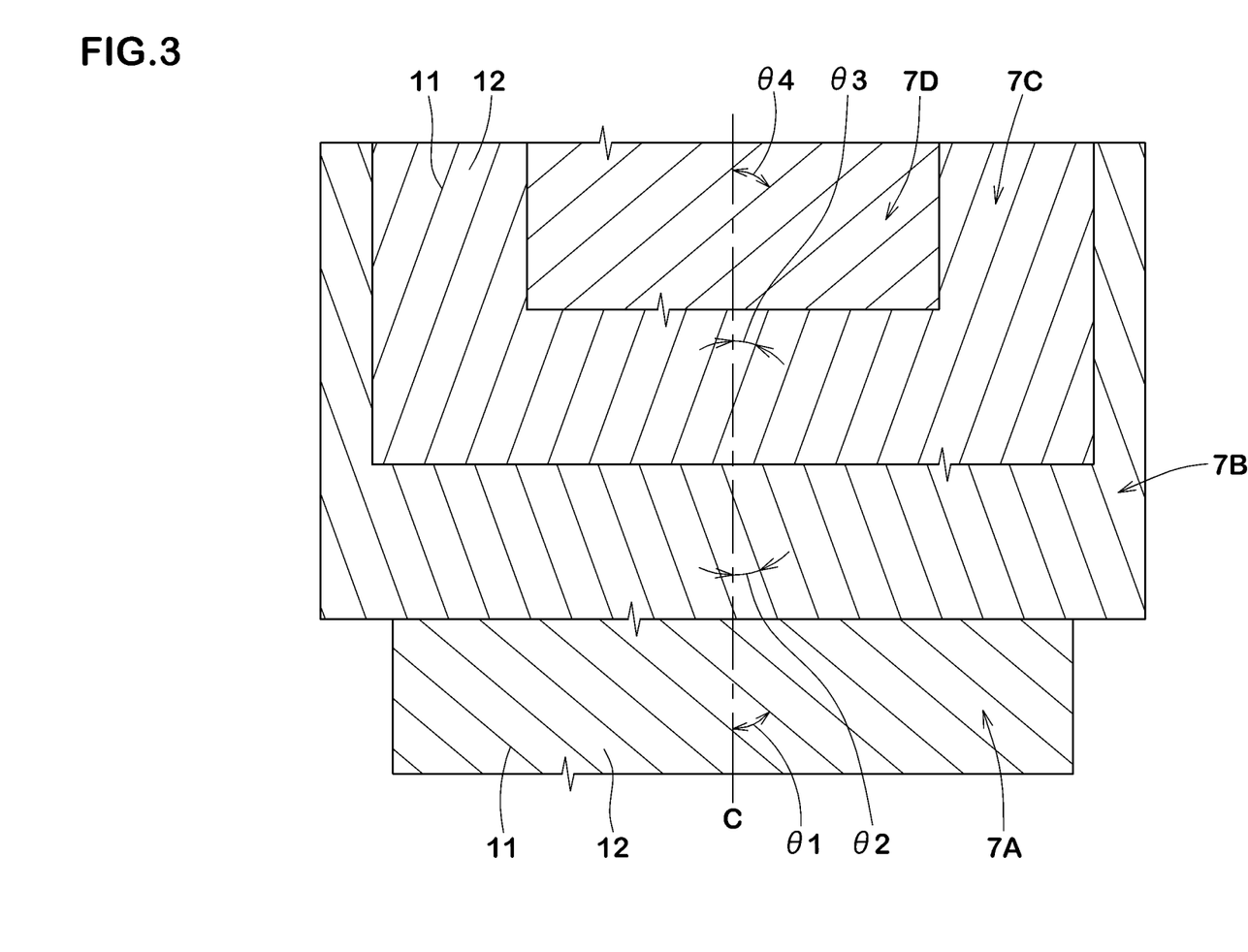
FIG. 3 is a development view of the belt.

FIG. 3 is a development view of the belt, wherein the belt cords 11 are shown in a simplified manner, and some of them are omitted.

As shown in FIG. 3, each of the first to fourth belt plies 7A to 7D is composed of parallel belt cords 11 inclined at an angle ($\theta 1$, $\theta 2$, $\theta 3$, $\theta 4$) with respect to the tire equatorial plane C. In the present embodiment, the belt cords 11 of the first belt ply 7A and the belt cords 11 of the second belt ply 7B are inclined with respect to the tire equatorial plane C to one side in the tire axial direction, and the belt cords 11 of the third belt ply 7C and the belt cords 11 of the fourth belt ply 7D are inclined with respect to the tire equatorial plane C to the other side in the tire axial direction.

The angle $\theta 1$ of the belt cords 11 of the first belt ply 7A with respect to the tire equatorial plane C is set to a value between the angle $\theta 2$ of the belt cords 11 of the second belt ply 7B with respect to the tire equatorial plane C, and the above-mentioned angle of the carcass cords (not shown) of the carcass ply 6A. Such first belt ply 7A can increase the rigidity of the belt, while alleviating the shear strain caused between the carcass ply 6A and the second belt ply 7B, and can further reinforce the tread portion 2.

In order to effectively enhance such function, it is preferable that the angle $\theta 1$ is set in a range from 30 to 60 degrees.

The belt cords 11 of the second belt ply 7B cross the belt cords 11 of the third belt ply 7C. Such second belt ply 7B and third belt ply 7C can increase the binding force in the tire circumferential direction, therefore, the second belt ply 7B and the third belt ply 7C can firmly reinforce the tread portion 2 with its hoop effect, and can improve the durability performance.

It is preferable that the angle $\theta 2$ of the belt cords 11 of the second belt ply 7B with respect to the tire equatorial plane C is set in a range from 15 to 25 degrees, and the angle $\theta 3$ of the belt cords 11 of the third belt ply 7C with respect to the tire equatorial plane C is set in a range from 15 to 25 degrees.

By setting the angles $\theta 2$ and $\theta 3$ to not more than 25 degrees, the tread portion 2 can be firmly reinforced and the durability performance can be improved.

By setting the angles $\theta 2$ and $\theta 3$ to not less than 15 degrees, it is possible to prevent the binding force in the tire circumferential direction from becoming unnecessarily large, so the riding comfort can be maintained.

From such viewpoints, the angles $\theta 2$ and $\theta 3$ are preferably not more than 22 degrees, and preferably not less than 18 degrees.

As shown in FIG. 1, the fourth belt ply 7D is located on the outermost side in the tire radial direction in the belt 7 in order to improve the cut resistance of the tread portion 2.

As shown in FIG. 2, a first distance L1 is set to be not more than a second distance L2, wherein the first distance L1 is a distance in the tire radial direction between the belt cords 11 of the third belt ply 7C and the belt cords 11 of the fourth belt ply 7D, and the second distance L2 is a distance in the tire radial direction between the belt cords 11 of the second belt ply 7B and the belt cords 11 of the third belt ply 7C.

Each of the first distance L1, the second distance L2 and the undermentioned third distance L3 may be defined by an average value of the distance between the belt cords 11 adjacent in the tire radial direction, which is averaged over the entire width of a region 20 where all of the first to fourth belt plies 7A to 7D overlap in the tire radial direction, in other words, all of the first to fourth belt plies 7A to 7D exist. In the present embodiment, such region 20 corresponds to a region having the width W4 (shown in FIG. 1) of the narrowest fourth belt ply 7D.

In the tire 1 of the present embodiment, as the first distance L1 is not more than the second distance L2, it is possible to prevent the amount of rubber (topping rubber 12) constituting the fourth belt ply 7D from becoming relatively increased.

The fourth belt ply 7D affects the rolling resistance performance of the tire as compared with the first to third belt plies 7A to 7C disposed radially inside the fourth belt ply 7D. Therefore, in the tire 1 of the present embodiment, as the first distance L1 is set to not more than the second distance L2, an increase in energy loss of the belt 7 (fourth belt ply 7D) can be prevented, and thereby, the rolling resistance performance is maintained. Further, since it is possible to prevent an increase in the amount of rubber (topping rubber 12) of the fourth belt ply 7D, it is possible to suppress an increase in the mass of the tire 1.

It is preferable that the first distance L1 is set in a range from 80% to 100% of the second distance L2.

By setting the first distance L1 to not more than 100% of the second distance L2, the rolling resistance performance can be maintained.

By setting the first distance L1 to not less than 80% of the second distance L2, it is possible to suppress the belt cord loosening and separation from the rubber, and the durability performance can be maintained.

From such viewpoints, the first distance L1 is preferably not more than 95% of the second distance L2, and preferably not less than 85% of the second distance L2.

The fourth belt ply 7D has a smaller effect on the airtightness (air retention) of the tire inner cavity as compared with the first belt ply 7A to the third belt ply 7C. Therefore, even if the first distance L1 is set smaller than the second distance L2, the airtightness of the inner cavity of the tire 1 can be maintained.

The first distance L1 can be appropriately set as long as the above relationship with the second distance L2 is maintained.

In the present embodiment, it is preferable that the first distance L1 is set in a range from 0.4 to 1.0 mm.

By setting the first distance L1 to not more than 1.0 mm, the rolling resistance performance can be maintained.

By setting the first distance L1 to not less than 0.4 mm, it is possible to suppress a decrease in the cut resistance of the fourth belt ply 7D, and the durability performance can be maintained.

From such viewpoints, the first distance L1 is preferably not more than 0.8 mm, and preferably not less than 0.6 mm.

In the present embodiment, the third distance L3, which is the distance in the tire radial direction between the belt cords 11 of the second belt ply 7B and the belt cords 11 of the first belt ply 7A, is set to be the same as the second distance L2. Thereby, the reduction in the amount of rubber (topping rubber 12) constituting the first belt ply 7A and the second belt ply 7B can be maintained, so the airtightness (air retention) of the tire inner cavity can be maintained. In the present specification, the "same" means to include slight variations (errors) in manufacturing.

In the present embodiment, the cord count E4 of the fourth belt ply 7D is set to be smaller than the cord count E3 of the third belt ply 7C.

Here, the cord count is the number of the belt cords 11 per a unit ply width. The unit ply width is a length measured, in the meridian cross section of the tire under its normally inflated unloaded state, along the belt ply for which the number of the belt cords is counted.

In this embodiment, the unit ply width is 50 mm.

In the present embodiment, as the fourth belt ply's cord count E4 is smaller than the third belt ply's cord count E3, the fourth belt ply 7D can be reduced in the belt cords 11 while being increased in the rubber (topping rubber 12) covering the belt cords 11. Thereby, in the fourth belt ply 7D, the adhesion between the belt cords 11 and the rubber can be improved, so the belt cord loosening and separation from the rubber can be suppressed. Therefore, the tire 1 can be improved in the durability performance (cord loosening resistance performance).

In the present embodiment, since the fourth belt ply's cord count E4 is smaller than the third belt ply's cord count E3, even when the first distance L1 is not more than the second distance L2, the adhesion between the belt cords 11 of the fourth belt ply 7D and the rubber can be increased. Therefore, in the tire 1 of the present embodiment, it is possible to maintain the rolling resistance performance and improve the durability performance.

It is preferable that the fourth belt ply's cord count E4 is set in a range from 65% to 85% of the third belt ply's cord count E3.

By setting the fourth belt ply's cord count E4 to not more than 85% of the third belt ply's cord count E3, the cord loosening of the fourth belt ply 7D can be effectively prevented, and the durability performance can be improved.

By setting the fourth belt ply's cord count E4 to not less than 65% of the third belt ply's cord count E3, it is possible to prevent the belt cords 11 from becoming less than necessary, so the rolling resistance performance and the cut resistance performance can be maintained. From such viewpoints, the fourth belt ply's cord count E4 is preferably not more than 80% of the third belt ply's cord count E3, and preferably not less than 70% of the third belt ply's cord count E3.

In the present embodiment, the cord count E1 of the first belt ply 7A and the cord count E2 of the second belt ply 7B are set to be the same as the cord count E3 of the third belt ply 7C. Thereby, the first belt ply 7A to the third belt ply 7C can firmly reinforce the tread portion 2, and can improve the durability performance.

With respect to the cord count per 50 mm ply width, the first belt ply's cord count E1 to the fourth belt ply's cord count E4 can be appropriately set as long as the above relationships are satisfied.

For example, the fourth belt ply's cord count E4 may be set in a range from 12 to 22 cords per 50 mm ply width, and the first belt ply's cord count E1 to the third belt ply's cord count E3 may be set in a range from 19 to 27 cords per 50 mm ply width.

The belt cords 11 of the fourth belt ply 7D have a cord diameter D4.

The belt cords 11 of the third belt ply 7C have a cord diameter D3.

Preferably, the cord diameter D4 is not more than the cord diameter D3.

Thereby, the fourth belt ply 7D can be increased in the rubber (topping rubber 12) covering the belt cords 11 while being reduced in the belt cords 11.

Thereby, the cord loosening of the fourth belt ply 7D can be prevented, and the durability performance of the tire 1 can be improved.

Incidentally, when the belt cord 11 is formed from the twisted steel filaments, the cord diameter can be defined as the diameter of a circle circumscribing the bundle of the steel filaments.

It is preferable that the fourth belt ply's cord diameter D4 is set in a range from 65% to 100% of the third belt ply's cord diameter D3.

By setting the fourth belt ply's cord diameter D4 to not more than 100% of the third belt ply's cord diameter D3, it is possible to prevent the cord loosening of the fourth belt ply 7D and improve the durability performance.

By setting the fourth belt ply's cord diameter D4 to not less than 65% of the third belt ply's cord diameter D3, it is possible to prevent the belt cords 11 from becoming less than necessary, so the rolling resistance performance and the cut resistance performance can be maintained.

From such viewpoints, the fourth belt ply's cord diameter D4 is preferably not more than 90% of the third belt ply's cord diameter D3, and preferably not less than 75% of the third belt ply's cord diameter D3.

The belt cords 11 of the first belt ply 7A have a cord diameter D1.

The belt cords 11 of the second belt ply 7B have a cord diameter D2.

In the present embodiment, the cord diameter D1 and the cord diameter D2 are set to be the same as the cord diameter D3 of the third belt ply 7C. Thereby, the first belt ply 7A to the third belt ply 7C can firmly reinforce the tread portion 2 and improve the durability performance.

As shown in FIG. 3, it is preferable that the angle θ4 of the belt cords 11 of the fourth belt ply 7D with respect to the tire equatorial plane C is set in a range from 30 to 60 degrees.

By setting the angle θ4 to not less than 30 degrees, the tire 1 rolling under load can be deformed such that, while the annular tread portion maintains its original circular shape (namely, not deformed), its center is displaced downward in the tire radial direction from the tire rotational axis.

Thus, the strain generated in the fourth belt ply 7D during tire rolling can be reduced. Therefore, cord loosening in the fourth belt ply 7D can be prevented, and the durability performance can be improved.

On the other hand, by setting the angle θ4 to not more than 60 degrees, the cut resistance can be maintained.

From such viewpoints, the angle θ4 is preferably not less than 40 degrees, and preferably not more than 50 degrees.

It is preferable that, as shown in FIG. 2, the shortest distance L4 in the tire radial direction between each main groove 14 and the belt cords 11 of the fourth belt ply 7D is set in a range from 3 to 7 mm.

By setting the shortest distance L4 to not less than 3 mm, the adhesion between the belt cords 11 and the tread rubber 2G can be improved. Thereby, it is possible to prevent cord loosening of the fourth belt ply 7D, and improve the durability performance of the tire 1. On the other hand, by setting the shortest distance L4 to not more than 7 mm, it is possible to prevent an increase in energy loss in the tread rubber 2G and the fourth belt ply 7D. Therefore, it is possible to maintain the rolling resistance performance.

From such viewpoints, the shortest distance L4 is preferably not less than 4 mm, and preferably not more than 6 mm.

It is preferable that, as shown in FIG. 1, the axial width W4 of the fourth belt ply 7D is set in a range from 25% to 75% of the tread width TW.

By setting the fourth belt ply's axial width W4 to not more than 75% of the tread width TW, the amount of rubber (topping rubber 12) constituting the fourth belt ply 7D is reduced. Thereby, an increase in the energy loss of the fourth belt ply 7D is prevented, and the rolling resistance performance of the tire can be improved.

On the other hand, by setting the fourth belt ply's axial width W4 to not less than 25% of the tread width TW, the cut resistance can be maintained.

From such viewpoints, the fourth belt ply's axial width W4 is preferably not more than 60% of the tread width TW, and preferably not less than 40% of the tread width TW.

While detailed description has been made of a preferable embodiment of the present disclosure, the present disclosure can be embodied in various forms without being limited to the illustrated embodiment.

Comparison Tests

Embodiment A

Heavy-duty tires having the internal structure shown in FIG. 1 and specifications shown in Table 1 were experimentally manufactured as test tires (Working examples Ex. 1 to Ex. 9 and Comparative example Ref). Then, each tire was tested for the durability performance (drum test, presence or absence of belt cord separation), durability performance (plunger test), and rolling resistance performance.

The common specifications are as follows.
Tire size: 275/80R22.5
Rim size: 8.25×22.5
Tire pressure: 900 kPa
Tire load: 28.8 kN
Tread width TW: 240 mm
Slip angle: 0 degrees
First belt ply:
    belt cord angle θ1: 50 degrees
    cord count E1: 19 cords per 50 mm ply width
    first distance L1: 0.5 mm
Second belt ply and third belt ply:
    belt cord angles θ2 and θ3: 15 degrees
    cord counts E2 and E3: 27 cords per 50 mm ply width
Fourth belt ply:
    belt cord angle θ1: 50 degrees
    shortest distance L4 from main groove: 4.0 mm
    axial width W4/tread width TW: 40%

<Durability Performance (Drum Test, Belt Cord Separation)>

Each test tire was mounted on a wheel rim of the above-mentioned size, and inflated to the above-mentioned tire pressure. Then, using a drum-type tire tester, each test tire was run under the above-mentioned tire load and slip angle, and the running speed was increased gradually from the initial speed of 80 km/h at a step of 10 km/h every two hours after the start of running to obtain the running time until the tire was broken.

The results are shown in Table 1 by an index based on Working example Ex. 3 being 100, wherein the larger value is better, and when the value is 95 or more, it is considered that the durability performance (resistance to cord loosening) required for heavy-duty tires is secured.

In addition, the broken test tire was disassembled, and checked for the presence or absence of separation (cord loosening) caused at the interface between the belt cords and the tread rubber.

<Durability Performance (Plunger test)>

Each test tire was mounted on a wheel rim of the above-mentioned size, and inflated to the above-mentioned tire pressure. Then, a plunger test according to Japanese Industrial Standards D4230 was performed to determine the tire plunger energy required to completely penetrate the tread portion.

The results are shown in Table 1 by an index based on Working example Ex. 3 being 100, wherein the larger value is the better, and when the value is 95 or more, it is considered that the cut resistance required for heavy-duty tires is secured.

<Rolling Resistance Performance>

Each test tire was mounted on a wheel rim of the above-mentioned size, and inflated to the above-mentioned tire pressure. Then, using a tire rolling resistance tester, the rolling resistance was measured at the running speed of 60 km/h under the above-mentioned tire load.

The results are shown in Table 1 by an index based on Working example Ex. 3 being 100, wherein the smaller value is the better, and when the value is 105 or less, it is considered that the rolling resistance performance required for heavy-duty tires is secured.

TABLE 1

| Tire | Ref. | Ex. 1 | Ex. 2 | Ex. 3 | Ex. 4 |
|---|---|---|---|---|---|
| first distance L1/second distance L2 (%) | 100 | 100 | 100 | 100 | 100 |
| cord count E4/cord count E3 (%) | 100 | 90 | 85 | 74 | 65 |

TABLE 1-continued

| | | | | | |
|---|---|---|---|---|---|
| durability (drum test) | 90 | 97 | 99 | 100 | 102 |
| belt cord separation | yes | no | no | no | no |
| durability (plunger test) | 102.5 | 102 | 101 | 100 | 99 |
| rolling resistance | 97 | 98 | 99 | 100 | 101 |
| Tire | Ex. 5 | Ex. 6 | Ex. 7 | Ex. 8 | Ex. 9 |
| first distance L1/second distance L2 (%) | 100 | 95 | 85 | 80 | 75 |
| cord count E4/cord count E3 (%) | 60 | 74 | 74 | 74 | 74 |
| durability (drum test) | 103 | 99 | 98 | 97 | 95 |
| belt cord separation | no | no | no | no | no |
| durability (plunger test) | 97 | 99 | 98 | 97 | 96 |
| rolling resistance | 103 | 99 | 97 | 96 | 95 |

From the test results, it was confirmed that, as compared with Comparative example Ref. Working examples were improved in the durability while maintaining the rolling resistance performance.

Embodiment B

Heavy-duty tires having the internal structure shown in FIG. 1 and specifications shown in Table 2 were experimentally manufactured as test tires (Working examples Ex. 3 and Ex. 10 to Ex. 18). Then, each tire was tested for the durability performance (drum test, presence or absence of belt cord separation), durability performance (plunger test), and rolling resistance performance.

The common specifications are the same as those of Embodiment A except for the following specifications and the specifications shown in Table 2.
  first distance L1/second distance L2: 100%
  fourth belt ply's cord count E4/third belt ply's cord count E3: 74%
  fourth belt ply's cord diameter D4: 1.0 mm The test methods are as described in Embodiment A and the test results are shown in Table 2.

TABLE 2

| Tire | Ex. 3 | Ex. 10 | Ex. 11 | Ex. 12 | Ex. 13 |
|---|---|---|---|---|---|
| cord diameter D4/cord diameter D3 (%) | 100 | 90 | 75 | 65 | 60 |
| angle θ4 (degrees) | 40 | 40 | 40 | 40 | 40 |
| durability (plunger test) | 100 | 102 | 103 | 104 | 105 |
| belt cord separation | no | no | no | no | no |
| durability (plunger test) | 100 | 99 | 98 | 97 | 95 |
| rolling resistance | 100 | 101 | 102 | 103 | 105 |

| Tire | Ex. 14 | Ex. 15 | Ex. 16 | Ex. 17 | Ex. 18 |
|---|---|---|---|---|---|
| cord diameter D4/cord diameter D3 (%) | 100 | 100 | 100 | 100 | 100 |
| angle θ4 (degrees) | 25 | 30 | 50 | 60 | 65 |
| durability (plunger test) | 96 | 99 | 101 | 102 | 103 |
| belt cord separation | no | no | no | no | no |
| durability (plunger test) | 102 | 101 | 97.5 | 97 | 95 |
| rolling resistance | 98 | 99 | 101 | 102 | 103 |

From the test results, it was confirmed that, as compared with Working example Ex. 13 in which the fourth belt ply's cord diameter D4/the third belt ply's cord diameter D3 was outside the preferable range, Working examples Ex. 3 and Ex. 10 to Ex. 12 in which the fourth belt ply's cord diameter D4/the third belt ply's cord diameter D3 was within the preferable range were improved in the durability (cord loosening resistance), while maintaining the rolling resistance performance and durability (cut resistance).

Further, in Working examples Ex. 3 and Ex. 15 to Ex. 17 in which the angle θ4 of the fourth belt ply was within the preferable range,
  the deterioration of the rolling resistance performance and durability performance (cutting resistance performance) was suppressed, and the durability performance (cord loosening resistance) was improved,
  as compared with Working examples Ex. 14 and Ex. 18 in which the angle θ4 was outside the preferable range.

Embodiment C

Heavy-duty tires having the internal structure shown in FIG. 1 and specifications shown in Table 3 were experimentally manufactured as test tires (Working examples Ex. 3 and Ex. 19 to Ex. 28). Then, each tire was tested for the durability performance (drum test, presence or absence of belt cord separation), durability performance (plunger test), and rolling resistance performance.

The common specifications are the same as those of Embodiment A except for the following specifications and the specifications shown in Table 3.
  first distance L1/second distance L2: 100%
  fourth belt ply's cord count E4/third belt ply's cord count E3: 74%

The test methods are as described in Embodiment A, and the test results are shown in Table 3.

TABLE 3

| Tire | Ex. 3 | Ex. 19 | Ex. 20 | Ex. 21 | Ex. 22 | Ex. 23 |
|---|---|---|---|---|---|---|
| shortest distance L4 (mm) | 4.0 | 2.5 | 3.0 | 6.0 | 7.0 | 8.0 |
| fourth belt ply width W4/ tread width TW (%) | 40 | 40 | 40 | 40 | 40 | 40 |
| durability (drum test) | 100 | 95 | 100 | 105 | 106 | 106 |
| belt cord separation | no | no | no | no | no | no |
| durability (plunger test) | 100 | 95 | 99 | 105 | 106 | 106 |
| rolling resistance | 100 | 96 | 98 | 101 | 102 | 104 |

| Tire | Ex. 24 | Ex. 25 | Ex. 26 | Ex. 27 | Ex. 28 |
|---|---|---|---|---|---|
| shortest distance L4 (mm) | 4.0 | 4.0 | 4.0 | 4.0 | 4.0 |
| fourth belt ply width W4/ tread width TW (%) | 20 | 25 | 60 | 75 | 80 |
| durability (drum test) | 99 | 100 | 101 | 101 | 102 |
| belt cord separation | no | no | no | no | no |
| durability (plunger test) | 97.5 | 99 | 102 | 103 | 103 |
| rolling resistance | 98 | 99 | 101 | 102 | 104 |

From the test results, it was confirmed that, as compared with Working examples Ex. 19 and Ex. 23 in which the shortest distance L4 was outside the preferable range, Working examples Ex. 3, Ex. 20 and Ex. 22 in which the shortest distance L4 was within the preferable range were improved in the durability performance (cord loosening resistance) while maintaining the rolling resistance performance.

Further, as compared with Working examples Ex. 24 and Ex. 28 in which the fourth belt ply's axial width W4/tread width TW was outside the preferable range, Working examples Ex. 3 and Ex. 25 to Ex. 27 in which the fourth belt ply's axial width W4/tread width TW was within the preferable range were improved in the durability performance (cut resistance), while maintaining the rolling resistance performance.

Statement of the Present Disclosure

The present disclosure is as follows:—

Disclosure 1: A heavy-duty tire comprising: a tread portion, a pair of axially spaced bead portions each with a bead core therein, a pair of sidewall portions extending between the tread edges and the bead portions, a carcass extending between the bead cores in the bead portions through the tread portion and the sidewall portions, and a tread reinforcing belt disposed radially outside the carcass in the tread portion.
wherein
the belt comprises a first belt ply, a second belt ply, a third belt ply and a fourth belt ply which are arranged in this order from the carcass side toward the outside in the tire radial direction, and
each of the first to fourth belt plies is composed of belt cords inclined with respect to the tire equatorial plane,
wherein
a first distance L1 in the tire radial direction between the belt cords of the third belt ply and the belt cords of the fourth belt ply is not more than a second distance L2 in the tire radial direction between the belt cords of the second belt ply and the belt cords of the third belt ply, and
with respect to a cord count of a belt ply which is the number of the belt cords per unit width of the belt ply, a cord count E4 of the fourth belt ply is smaller than a cord count E3 of the third belt ply.

Disclosure 2: The heavy-duty tire according to claim 1, wherein the cord count E4 of the fourth belt ply is in a range from 65% to 85% of the cord count E3 of the third belt ply.

Disclosure 3: The heavy-duty tire according to claim 1 or 2, wherein the first distance L1 is in a range from 80% to 100% of the second distance L2.

Disclosure 4: The heavy-duty tire according to claim 1, 2 or 3, wherein the belt cords of the fourth belt ply have a cord diameter D4, the belt cords of the third belt ply have a cord diameter D3, and the cord diameter D4 is in a range from 65% to 100% of the cord diameter D3.

Disclosure 5: The heavy-duty tire according to claim 1, 2, 3 or 4, wherein the belt cords of the fourth belt ply are inclined at an angle in a range from 30 to 60 degrees with respect to the tire equatorial plane.

Disclosure 6: The heavy-duty tire according to any one of claims 1 to 5, wherein the tread portion is provided with a main groove extending in the tire circumferential direction, and a shortest distance in the tire radial direction between the belt cords of the fourth belt ply and the bottom of the main groove is in a range from 3 to 7 mm, Disclosure 7: The heavy-duty tire according to any one of claims 1 to 6, wherein the belt cords of the first belt ply are inclined at an angle in a range from 30 to 60 degrees with respect to the tire equatorial plane,
the belt cords of the second belt ply are inclined at an angle in a range from 15 to 25 degrees with respect to the tire equatorial plane, and
the belt cords of the third belt ply are inclined at an angle in a range from 15 to 25 degrees with respect to the tire equatorial plane.

Disclosure 8: The heavy-duty tire according to any one of claims 1 to 7, wherein the width in the tire axial direction, of the fourth belt ply is in a range from 25% to 75% of a tread width.

DESCRIPTION OF THE REFERENCE SIGNS 1 heavy-duty tire
7 belt
7A first belt ply
7B second belt ply
7C third belt ply
7D fourth belt ply
11 belt cord

The invention claimed is:
1. A heavy-duty tire comprising:
a tread portion;
a pair of axially spaced bead portions each with a bead core therein;

a pair of sidewall portions extending between the tread edges and the bead portions;

a carcass extending between the bead cores in the bead portions through the tread portion and the sidewall portions; and a tread reinforcing belt disposed radially outside the carcass in the tread portion, wherein the belt comprises a first belt ply, a second belt ply, a third belt ply and a fourth belt ply which are arranged in this order from the carcass side toward the outside in the tire radial direction, each of the first to fourth belt plies is composed of belt cords inclined with respect to the tire equatorial plane, the belt cords of the fourth belt ply are inclined at an angle which is not less than 40 degrees but not more than 50 degrees with respect to the tire equatorial plane, a first distance L1 in the tire radial direction between the belt cords of the third belt ply and the belt cords of the fourth belt ply is not more than 95% of a second distance L2 in the tire radial direction between the belt cords of the second belt ply and the belt cords of the third belt ply, with respect to a cord count of a belt ply which is the number of the belt cords per unit width of the belt ply, a cord count E4 of the fourth belt ply is not less than 70% but not more than 80% of a cord count E3 of the third belt ply, the belt cords of the first belt ply are inclined at an angle in a range from 30 to 60 degrees with respect to the tire equatorial plane, the belt cords of the second belt ply are inclined at an angle in a range from 15 to 25 degrees with respect to the tire equatorial plane, and the belt cords of the third belt ply are inclined at an angle in a range from 15 to 25 degrees with respect to the tire equatorial plane.

2. The heavy-duty tire according to claim 1, wherein the first distance L1 is not less than 85% of the second distance L2.

3. The heavy-duty tire according to claim 2, wherein
the belt cords of the fourth belt ply have a cord diameter D4,
the belt cords of the third belt ply have a cord diameter D3, and
the cord diameter D4 is in a range from 65% to 100% of the cord diameter D3.

4. The heavy-duty tire according to claim 2, wherein a cord count E2 of the second belt ply and a cord count E1 of the first belt ply are equal to the cord count E3 of the third belt ply.

5. The heavy-duty tire according to claim 4, wherein a third distance L3 in the tire radial direction between the belt cords of the second belt ply and the belt cords of the first belt ply is equal to the second distance L2.

6. The heavy-duty tire according to claim 2, wherein a third distance L3 in the tire radial direction between the belt cords of the second belt ply and the belt cords of the first belt ply is equal to the second distance L2.

7. The heavy-duty tire according to claim 1, wherein
the belt cords of the fourth belt ply have a cord diameter D4,
the belt cords of the third belt ply have a cord diameter D3, and
the cord diameter D4 is in a range from 65% to 100% of the cord diameter D3.

8. The heavy-duty tire according to claim 1, wherein
the tread portion is provided with a main groove extending in the tire circumferential direction, and
a shortest distance in the tire radial direction between the belt cords of the fourth belt ply and the bottom of the main groove is in a range from 3 to 7 mm.

9. The heavy-duty tire according to claim 8, wherein a cord count E2 of the second belt ply and a cord count E1 of the first belt ply are equal to the cord count E3 of the third belt ply.

10. The heavy-duty tire according to claim 1, wherein the width in the tire axial direction, of the fourth belt ply is in a range from 25% to 75% of a tread width.

11. The heavy-duty tire according to claim 1, wherein a third distance L3 in the tire radial direction between the belt cords of the second belt ply and the belt cords of the first belt ply is equal to the second distance L2.

12. A heavy-duty tire comprising:
a tread portion;
a pair of axially spaced bead portions each with a bead core therein;
a pair of sidewall portions extending between the tread edges and the bead portions;
a carcass extending between the bead cores in the bead portions through the tread portion and the sidewall portions; and
a tread reinforcing belt disposed radially outside the carcass in the tread portion,
wherein
the belt comprises a first belt ply, a second belt ply, a third belt ply and a fourth belt ply which are arranged in this order from the carcass side toward the outside in the tire radial direction,
each of the first to fourth belt plies is composed of belt cords inclined with respect to the tire equatorial plane,
the belt cords of the fourth belt ply are inclined at an angle which is not less than 40 degrees but not more than 50 degrees with respect to the tire equatorial plane,
a first distance L1 in the tire radial direction between the belt cords of the third belt ply and the belt cords of the fourth belt ply is not more than 95% of a second distance L2 in the tire radial direction between the belt cords of the second belt ply and the belt cords of the third belt ply, and
with respect to a cord count of a belt ply which is the number of the belt cords per unit width of the belt ply, a cord count E4 of the fourth belt ply is not less than 70% but not more than 80% of a cord count E3 of the third belt ply,
wherein
a cord count E2 of the second belt ply and a cord count E1 of the first belt ply are equal to the cord count E3 of the third belt ply.

13. The heavy-duty tire according to claim 12, wherein
the belt cords of the first belt ply are inclined at an angle in a range from 30 to 60 degrees with respect to the tire equatorial plane,
the belt cords of the second belt ply are inclined at an angle in a range from 15 to 25 degrees with respect to the tire equatorial plane, and
the belt cords of the third belt ply are inclined at an angle in a range from 15 to 25 degrees with respect to the tire equatorial plane.

14. The heavy-duty tire according to claim 12, wherein a third distance L3 in the tire radial direction between the belt cords of the second belt ply and the belt cords of the first belt ply is equal to the second distance L2.

* * * * *